2,909,546

CHROMIC SALTS OF DITHIOCARBAMIC ACIDS

Harold E. Bruner, Akron, Ohio, assignor to Monsanto Chemical Company, St. Louis, Mo., a corporation of Delaware No Drawing. Original application June 17, 1953, Serial No. 362,423. Divided and this application March 16, 1956, Serial No. 571,902

1 Claim. (Cl. 260—438)

Chromic salts of dithiocarbamic acids have been reported as unobtainable by admixing aqueous solutions of a soluble chromic salt and a soluble salt of the dithiocarbamic acid. Quantitative formation of chromic hydroxide takes place. However, it was found that the addition to water of a mixture of a soluble chromic salt and sodium dimethyl dithiocarbamate resulted in precipitation of chromic dimethyl dithiocarbamate. 51.3 parts by weight of sodium dimethyl dithiocarbamate were ground with 39.2 parts by weight of hydrated chromic sulfate. The latter contained approximately 10 moles of water of crystallization. The mixture was added to 700 parts by weight of water containing a small amount of sodium dodecyl benzene sulfonate. On stirring the solution gradually changed color from dark green to blue and a finely divided precipitate formed. The solids were removed by filtration, washed with water and dried. There was obtained 29.4 parts by weight of a light blue powder which contained 60% chromic dimethyl dithiocarbamate by analysis. The dry product can be dispersed in water to form a fungicide spray. However, it is preferred to form the precipitate as described, dilute to the desired strength and apply without isolating the dry product.

This application is a division of application Serial No. 362,423, filed June 17, 1953, now abandoned.

What is claimed is:

The method of making chromic dimethyl dithiocarbamate which comprises adding to water a mixture of dry sodium dimethyl dithiocarbamate and hydrated chromic sulfate sodium-dodecylbenzene sulfonate, the said salts being substantially in stoichiometric proportions.

References Cited in the file of this patent

UNITED STATES PATENTS

| 2,492,314 | Olin et al. | Dec. 27, 1949 |
| 2,662,841 | Fike et al. | Dec. 15, 1953 |

OTHER REFERENCES

Chem. Abstracts, vol. 34, cols. 5354–5366.